United States Patent
Yoon

(10) Patent No.: US 8,272,145 B2
(45) Date of Patent: Sep. 25, 2012

(54) DRYER

(75) Inventor: Myoung Kee Yoon, Daegu (KR)

(73) Assignee: LG Electronics Inc., Seoul (KR)

( * ) Notice: Subject to any disclaimer, the term of this patent is extended or adjusted under 35 U.S.C. 154(b) by 1006 days.

(21) Appl. No.: 10/562,508

(22) PCT Filed: Nov. 9, 2005

(86) PCT No.: PCT/KR2005/003786
§ 371 (c)(1),
(2), (4) Date: Jun. 6, 2008

(87) PCT Pub. No.: WO2006/052081

PCT Pub. Date: May 18, 2006

(65) Prior Publication Data

US 2008/0235984 A1  Oct. 2, 2008

(30) Foreign Application Priority Data

Nov. 10, 2004 (KR) .................. 10-2004-0091414
Nov. 10, 2004 (KR) .................. 10-2004-0091415
Nov. 10, 2004 (KR) .................. 10-2004-0091416

(51) Int. Cl.
    *F26B 21/00* (2006.01)
(52) U.S. Cl. ............... 34/601; 34/130; 34/595; 384/305
(58) Field of Classification Search .................. 34/130, 34/137, 601, 595, 606, 610; 384/305
    See application file for complete search history.

(56) References Cited

U.S. PATENT DOCUMENTS

| 2,648,142 A | * | 8/1953 | Shapter | 34/82 |
|---|---|---|---|---|
| 2,724,906 A | * | 11/1955 | Pfleider | 34/75 |
| 2,858,688 A | * | 11/1958 | Smith | 68/20 |
| 2,925,665 A | * | 2/1960 | Smith | 34/82 |
| 2,975,623 A | * | 3/1961 | Eichhorn et al. | 68/12.15 |
| 3,110,005 A | * | 11/1963 | Kripke | 338/35 |
| 3,121,000 A | * | 2/1964 | Hubbard | 34/75 |
| 3,306,640 A | | 2/1967 | Melton et al. | |
| 3,457,656 A | * | 7/1969 | Fox | 34/601 |
| 3,599,342 A | * | 8/1971 | Cotton | 34/393 |
| 4,621,438 A | * | 11/1986 | Lanciaux | 34/77 |
| 4,712,940 A | | 12/1987 | Wood, Jr. | |
| 4,887,916 A | | 12/1989 | Adam et al. | |
| 5,483,756 A | | 1/1996 | Heyder | |

(Continued)

FOREIGN PATENT DOCUMENTS

CN 2469236 1/2002

(Continued)

OTHER PUBLICATIONS

International Search Report dated Feb. 2, 2006.

*Primary Examiner* — Stephen M. Gravini

(74) *Attorney, Agent, or Firm* — McKenna Long & Aldridge LLP

(57) ABSTRACT

A drying machine in which a rotary drum is stably supported is disclosed. The drying machine includes a cabinet; a drum rotatably installed in the cabinet for containing laundry to be dried; a first housing connected to the drum; a second housing connected to the first housing; first and second bearings respectively provided in the first and second housings; and a shaft supported by the first and second bearings, and rotatably connected to the drum.

33 Claims, 16 Drawing Sheets

U.S. PATENT DOCUMENTS

| | | | |
|---|---|---|---|
| 7,523,564 B2 * | 4/2009 | Doh | 34/601 |
| 7,644,514 B2 * | 1/2010 | Heyder et al. | 34/595 |
| 2005/0241346 A1 * | 11/2005 | Choi | 68/140 |
| 2008/0235984 A1 * | 10/2008 | Yoon | 34/601 |

FOREIGN PATENT DOCUMENTS

| | | | |
|---|---|---|---|
| EP | 344452 A1 | | 12/1989 |
| EP | 1 548 176 | * | 6/2005 |
| EP | 1746192 A2 | * | 1/2007 |
| JP | 2004000608 A | * | 1/2004 |
| JP | 2005193050 A | * | 7/2005 |
| JP | 2007014795 A | * | 1/2007 |
| WO | WO 2008103007 A2 | * | 8/2008 |
| WO | WO 2010137912 A2 | * | 12/2010 |

* cited by examiner

DRYER

This application claims priority to International Application No. PCT/KR2005/003786 filed on Nov. 9, 2005, as well as Korean Applications P 2004-91414 filed on Nov. 10, 2004, P 2004-91415 filed on Nov. 10, 2004 and P 2004-91416 filed on Nov. 10, 2004, all of which are incorporated by reference, as if fully set forth herein.

TECHNICAL FIELD

The present invention relates to a drying machine, and more particularly, to a bearing structure rotatably supporting a drum of a drying machine.

BACKGROUND ART

Generally, a drying machine is an apparatus for drying laundry using hot air generated by a heater. The drying machine comprises a drum for containing laundry, and the hot air is supplied to the drum. In order to promote the drying of the laundry, the drum is rotated preferably by a driving device, and a bearing structure for supporting a shaft of the rotating drum is provided to the drying machine.

The above conventional bearing structure of the drying machine has problems, as follows.

First, grease serving as a lubricant leaks from a bearing while the drying machine is being used, thereby hindering lubricating movements of the bearing and the shaft.

Second, the bearing is generally made of a metal. Such a metal bearing cannot be finely manufactured, thereby causing abnormally excessive abrasion of a journal of the shaft and noise.

DISCLOSURE OF INVENTION

An object of the present invention devised to solve the problem lies on provision of a bearing structure for stably supporting a rotary drum.

The object of the present invention can be achieved by providing a drying machine comprising: a cabinet; a drum rotatably installed in the cabinet for containing laundry to be dried; a first housing connected to the drum; a second housing connected to the first housing; first and second bearings respectively provided in the first and second housings; and a shaft supported by the first and second bearings, and rotatably connected to the drum.

The first and second bearings may be connected to each other, and preferably may be connected to each other such that they are respectively sealed. In order to form the sealed structure, one of the first and second bearings may comprise ribs formed therein along its edge, and the other one of the first and second bearings may comprise grooves engaged with the ribs.

The shaft may be fixed to the cabinet. Thereby, the first and second bearings are rotated together with the rotation of the drum.

The first and second bearings support the shaft in the radial direction and the axial direction of the shaft. Thus, the first and second bearings surround the end of a journal of the shaft.

The journal of the shaft may have a spherical shape, and each of the first and second bearings may comprise a recess for mounting the spherical journal.

The journal of the shaft may be made of a metal, and a space for storing a grease may be formed between a journal of the shaft and the first and second bearings. Further, the journal of the shaft may comprise at least one oil groove formed therein along its outer circumferential surface.

The first and second bearing may be formed by injection molding and be made of plastic.

Preferably, the first and second bearings are respectively formed integrally with the first and second housings.

In another aspect of the present invention, provided herein is a drying machine comprising: a cabinet; a drum rotatably installed in the cabinet for containing laundry to be dried; a first bearing connected to the drum; a second bearing connected to the first bearing; and a shaft supported by the first and second bearings, and rotatably connected to the drum.

In a further aspect of the present invention, provided herein is a drying machine comprising: a cabinet; a drum rotatably installed in the cabinet for containing laundry to be dried; a shaft connected to the drum; a housing unit provided on the cabinet, and surrounding the shaft; and a bearing installed in the housing unit, and rotatably supporting the shaft.

Advantageous Effects

In the drying machine, the drum during rotation is stably supported.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
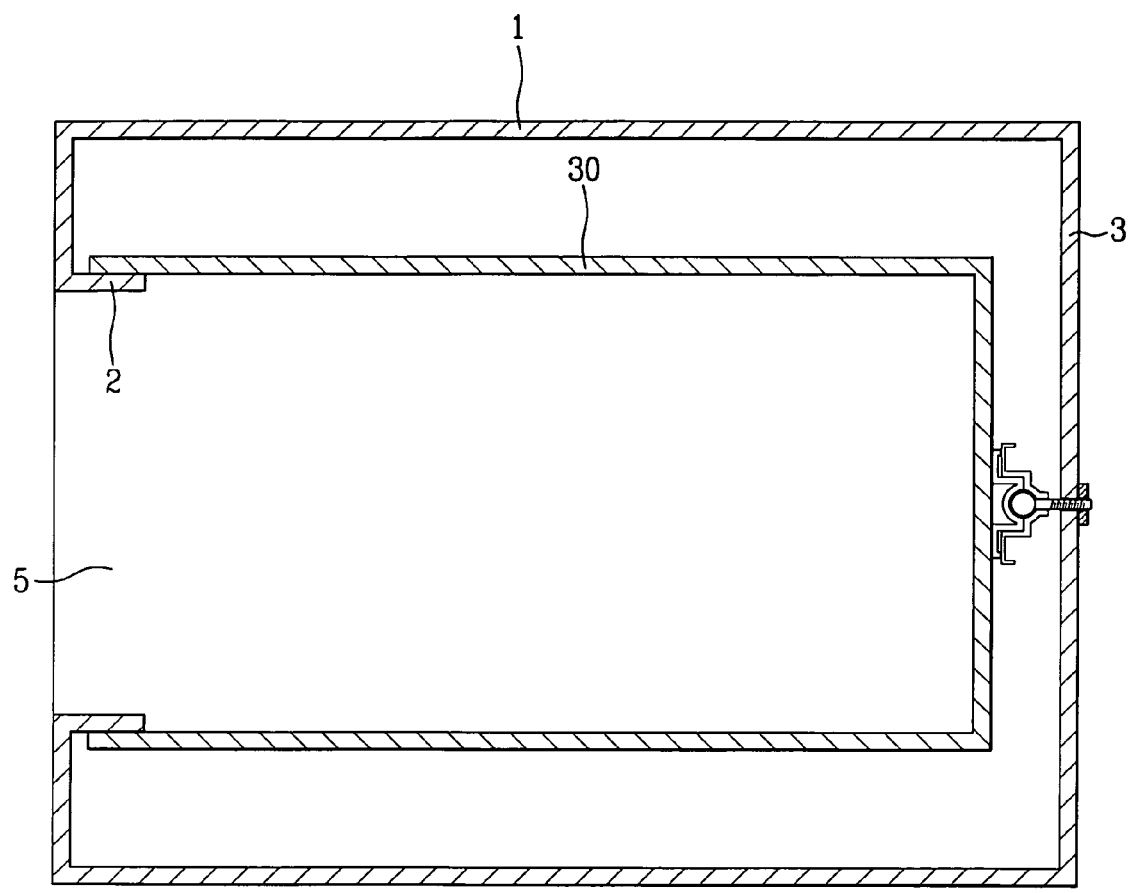
FIG. 1 is a schematic transversal sectional view of a drying machine in accordance with the present invention.

Reference will now be made in detail to the preferred embodiments of the present invention, examples of which are illustrated in the accompanying drawings. In the following description of the present invention, the same or similar elements are denoted by the same reference numerals and terms and a detailed description thereof will thus be omitted because it is considered to be unnecessary.

FIG. 1 is a schematic transversal sectional view of a drying machine in accordance with the present invention;

The drying machine of the present invention comprises a cabinet 1 and a drum 30 rotatably installed in the cabinet 1. An opening 5 is formed through the front surface of the cabinet 1, and laundry is put into the drum 30 through the opening 5. A rib 2, which is formed along the opening 5, is inserted into the drum 30 and rotatably supports the front portion of the drum 30. The drum 30 is rotated by designated driving devices, for example, a motor and a belt for connecting the motor and the drum 30. Other various mechanisms may be used as the driving device of the drum 30. The drum 30 is rotatably installed on a rear surface 3 of the cabinet 1. A bearing structure is applied between the drum 30 and the rear surface 3 of the cabinet 1 so as to stably support the rotating drum 30. Hereinafter, the bearing structure will be described in detail with reference to corresponding drawings, as below.

Figure 2:
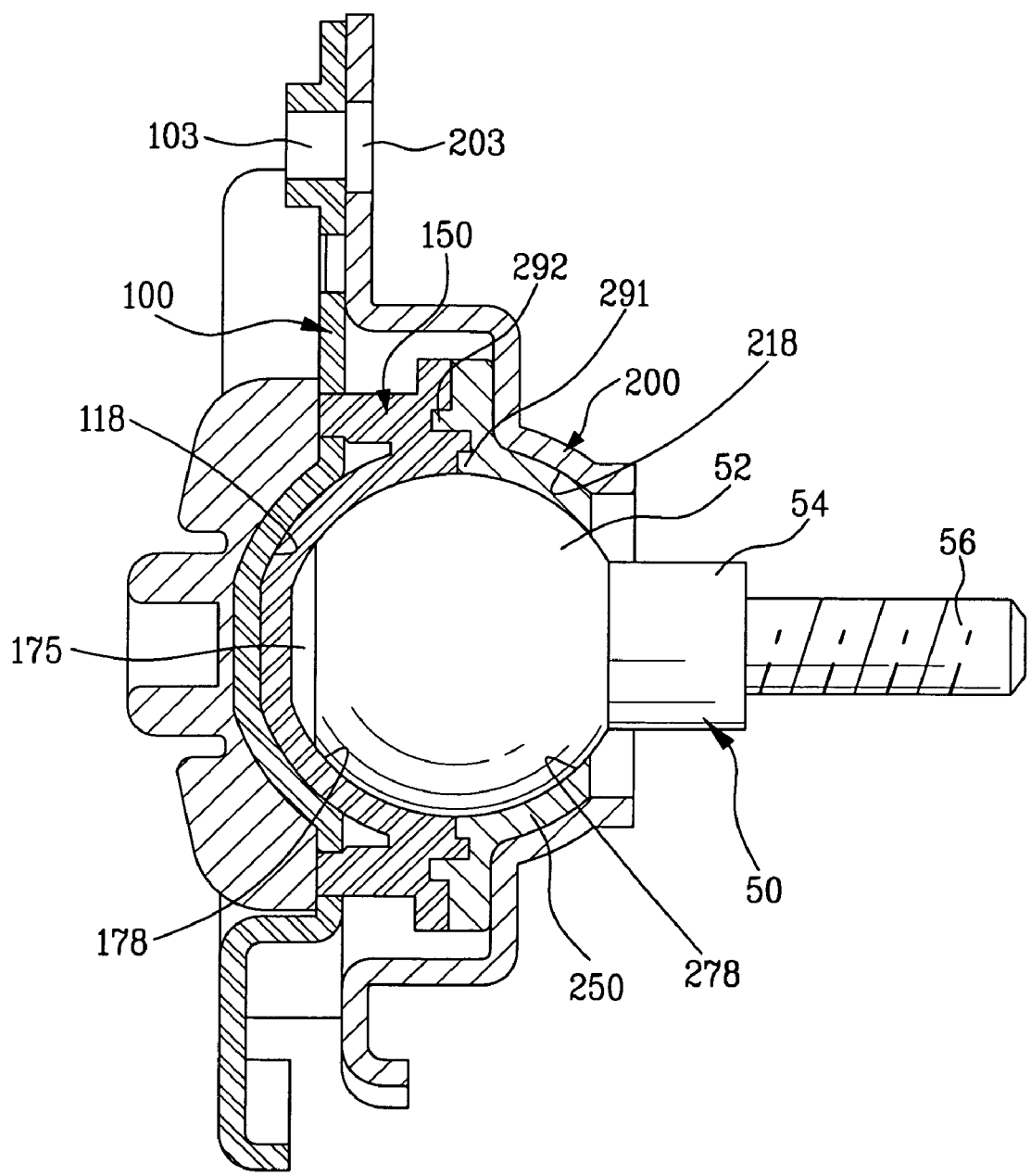
FIG. 2 is a sectional view of a first embodiment of a bearing structure of the drying machine in accordance with the present invention.
Figure 3:
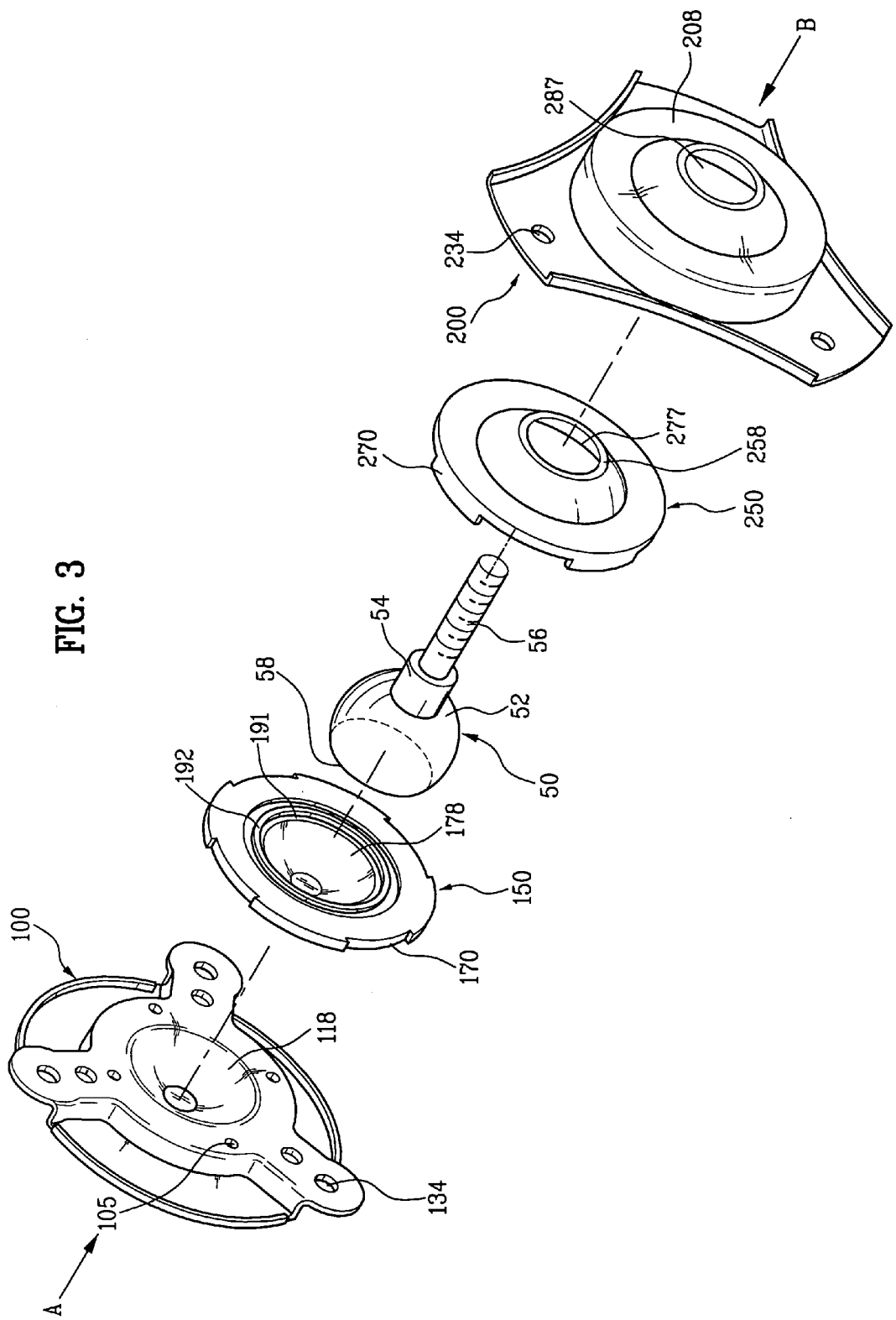
FIG. 3 is an exploded perspective view of the first embodiment of the bearing structure.

FIG. 2 is a sectional view of a first embodiment of a bearing structure of the drying machine in accordance with the present invention, and FIG. 3 is an exploded perspective view of the first embodiment of the bearing structure. As shown in FIGS. 2 and 3, the first embodiment of the bearing structure comprises first and second housings 100 and 200, first and second bearings 150 and 250, and a shaft 50.

The first housing 100 is connected to the drum 30 (FIG. 1), and the second housing 200 is connected to the first housing 100. The first and second bearings 150 and 250 are installed between the first housing 100 and the second housing, and the shaft 50, more precisely, a journal 52 of the shaft 50, is mounted between the first bearing 150 and the second bearing 250.

Figure 4:
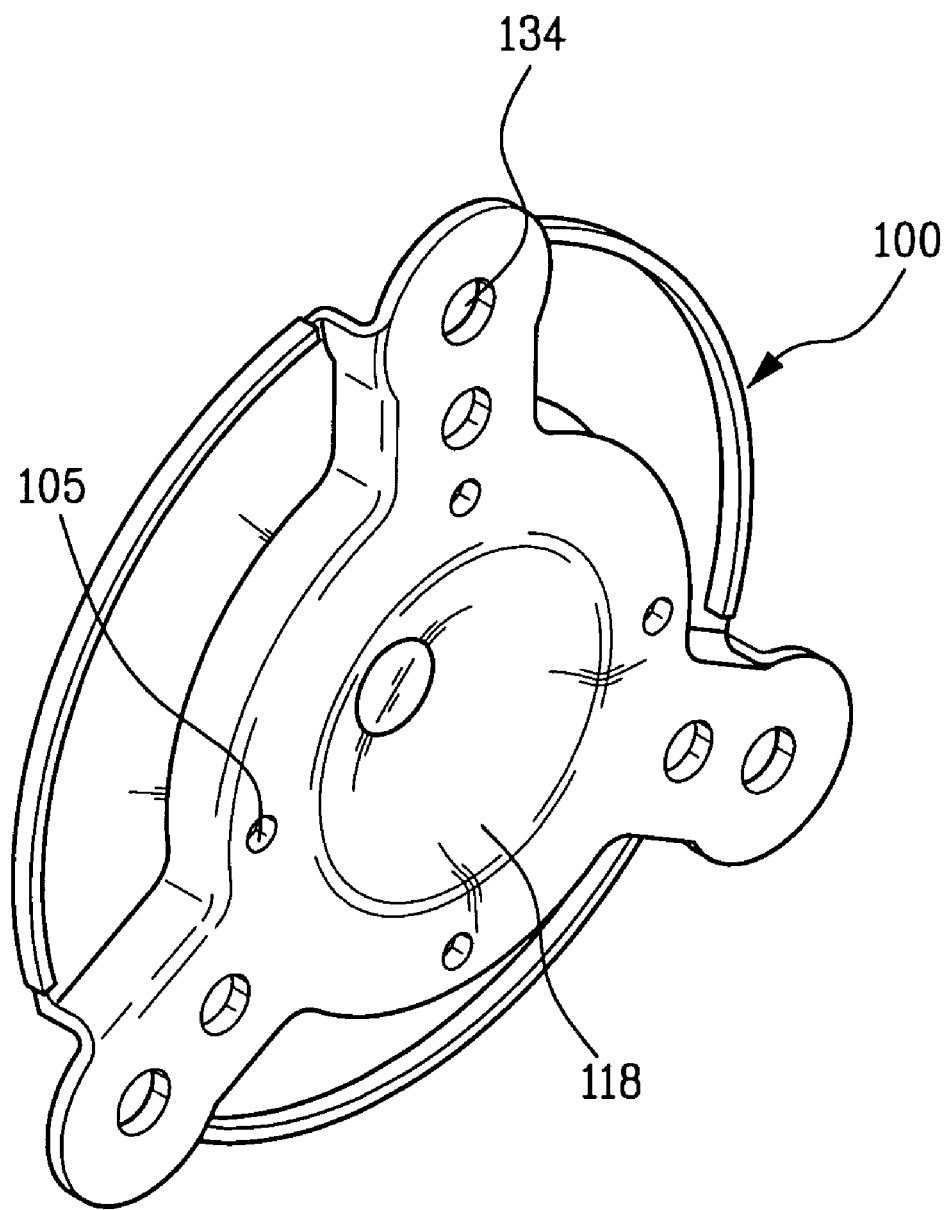
FIG. 4 is a perspective view of a first housing observed in the direction of "B" of FIG. 3.

With reference to FIG. 4, the first housing 100 has an approximately circular shape, and a seat 118 for mounting the first bearing 150 is formed in the central portion of the first housing 100. A plurality of connection holes 134 are formed through the first housing 100 so that the first housing 100 is connected to the drum 30 by connection members (not shown), and a plurality of recesses 105 are formed along the circumference of the seat 118.

Figure 5:
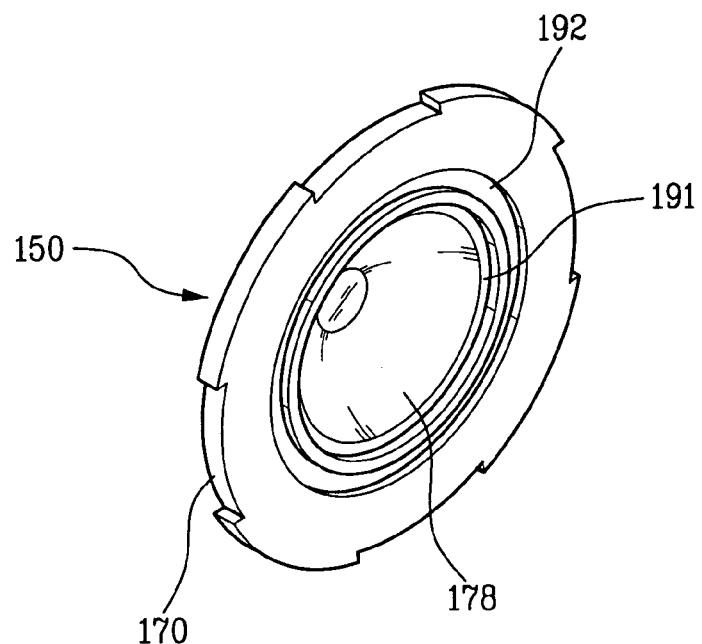
FIG. 5 is a perspective view of a first bearing observed in the direction of "B" of FIG. 3.
Figure 6:
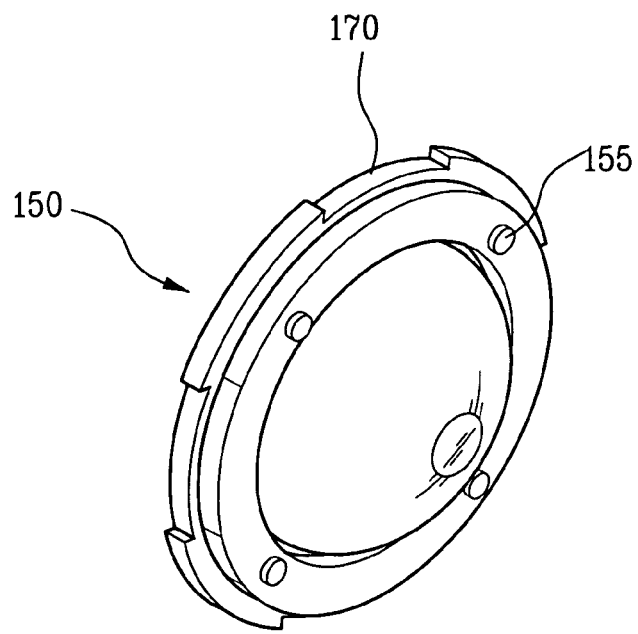
FIG. 6 is a perspective view of the first bearing observed in the direction of "A" of FIG. 3.

With reference to FIGS. 5 and 6, the first bearing 150 has an approximately circular shape, and comprises a recess 178 formed therein for mounting the journal 52 of the shaft 50. Preferably, the recess 178 has a size corresponding to the size of the seat 118 of the first housing 100. As shown in FIG. 6 in detail, the first bearing 150 further comprises protrusions 155 corresponding to the recesses 105 of the first housing 100. The protrusions 155 are inserted into the recesses 105, thereby causing the first bearing 150 to be directly and precisely connected to the first housing 100 without using connection members. The protrusions 155 may be formed on the first housing 100, and the recesses 105 may be formed in the first bearing 150. In this case, the same function can be achieved. At least one recess 170 is formed along the circumference of the first bearing 150. Grooves 191 and 192 are formed in the surface of the first bearing 150 facing the second bearing 250 along the circumference of the recess 178.

Figure 7:
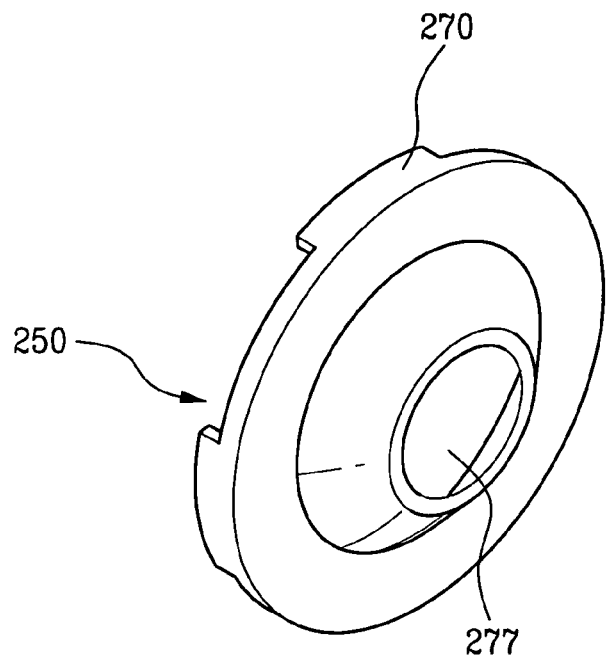
FIG. 7 is a perspective view of a second bearing observed in the direction of "B" of FIG. 3.
Figure 8:
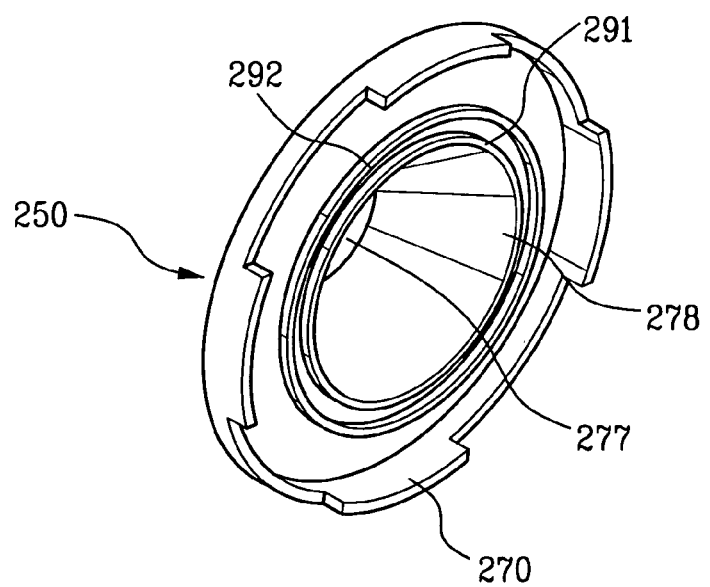
FIG. 8 is a perspective view of the second bearing observed in the direction of "A" of FIG. 3.

With reference to FIGS. 7 and 8, the second bearing 250 has an approximately circular shape, and comprises a recess 278 for mounting the journal 52 of the shaft 50 and a through hole 277 for passing the shaft 50. The second bearing 250 further comprises at least one rib 270 having a position and size corresponding to those of the recess 170 of the first bearing 150. Accordingly, the second bearing 250 is directly connected to the first bearing 150 by inserting the rib 270 into the recess 170 preferably without using connection members. The rib 270 may be formed on the first bearing 150, and the recess 170 may be formed in the second bearing 250. In this case, the same function can be achieved.

Further, circular ribs 291 and 292 having positions and sizes corresponding to those of the grooves 191 and 192 of the first bearing 150 are formed on the second bearing 250. When the first and second bearings 150 and 250 are connected to each other, the ribs 291 and 292 and the grooves 191 and 192 are engaged with each other. Accordingly, the first and second bearings 150 and 250, more precisely, the recesses 178 and 278, are tightly sealed by the ribs 291 and 292 and the grooves 191 and 192. The ribs 291 and 292 and the grooves 191 and 192 prevent a grease from leaking from the first and second bearings 150 and 250, and more precisely, from the recesses 178 and 278, during the rotation of the drum. The ribs 291 and 292 may be formed on the first bearing 150, and the grooves 191 and 192 may be formed in the second bearing 250. In this case, the same function can be achieved.

Figure 9:
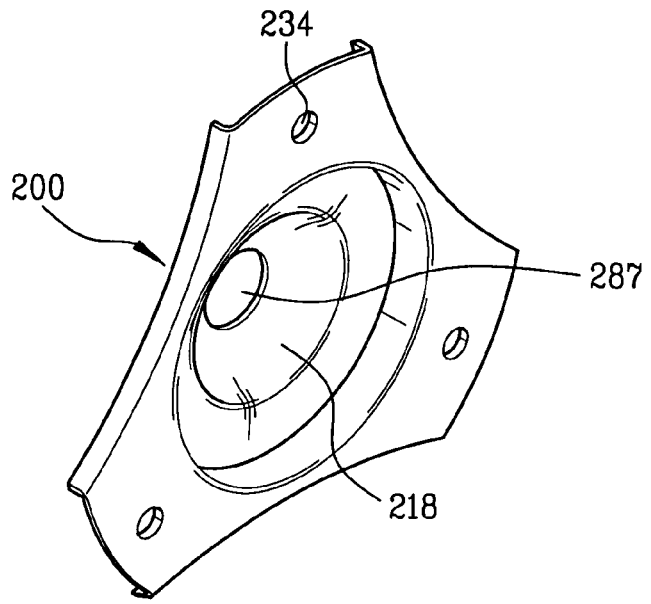
FIG. 9 is a perspective view of a second housing observed in the direction of "A" of FIG. 3.
Figure 10:
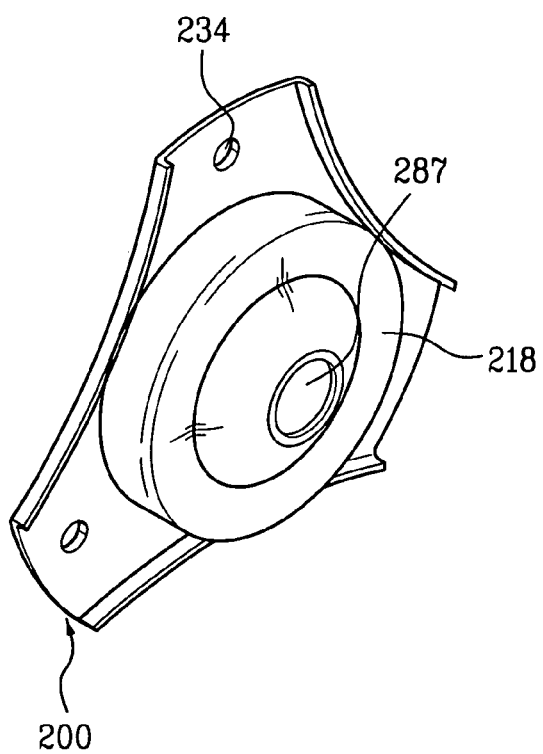
FIG. 10 is a perspective view of the second housing observed in the direction of "B" of FIG. 3.

With reference to FIGS. 9 and 10, a plurality of connection holes 234 are formed through the second housing 200 at positions corresponding to the connection holes 134 of the first housing 100. Thus, the first and second housings 100 and 200 are connected to the drum 30 using the connection holes 134 and 234 and connection members (for example, screws) passing through the connection holes 134 and 234.

The second housing 200 comprises a seat 218 for mounting the second bearing 250. Further, the second housing 200 comprises a through hole 287 for passing the shaft 50.

Figure 11:
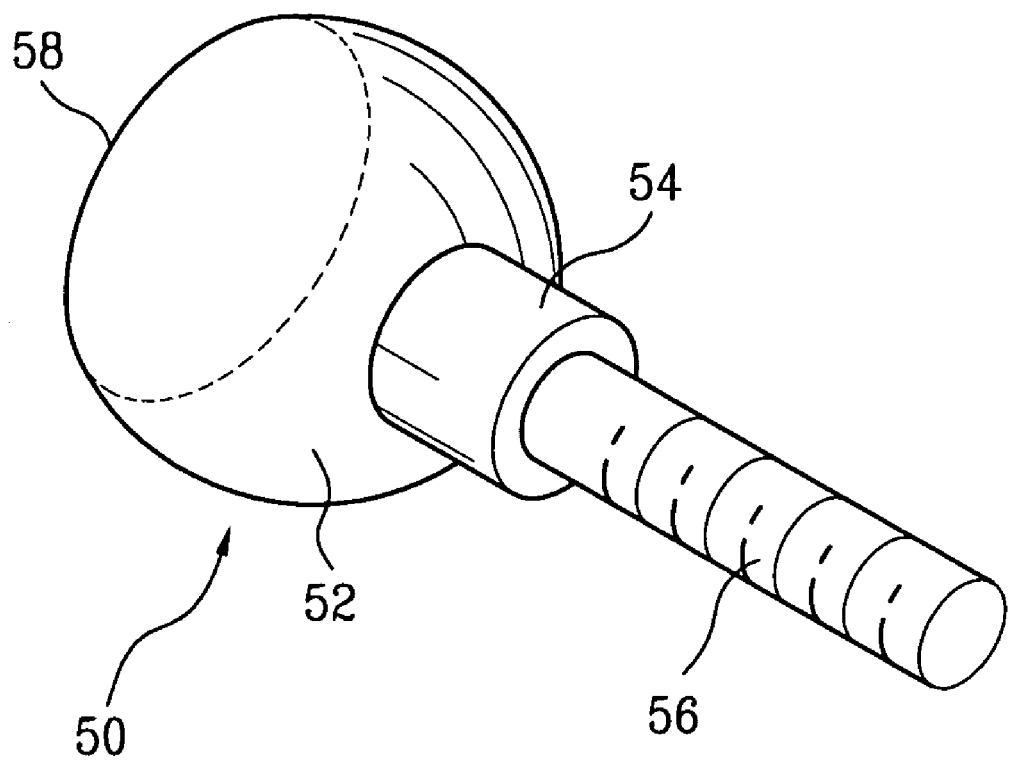
FIG. 11 is a perspective view of a shaft of the first embodiment of the bearing structure.

With reference to FIG. 11, the shaft 50 comprises a body 54, and the journal 52 supported by the first and second bearings 150 and 250. As shown in FIG. 1, the body 54 is fixed to the rear surface 3 of the cabinet 1 using a screw portion 56 formed on the body 54 and a connection member, and the journal 52 is supported by the first and second bearings 150 and 250. The drum 30 is rotatably connected to the shaft 50. Accordingly, while the drying machine is being driven, the shaft 50 is stationary and the drum 30 is rotated against the shaft 50 together with the rotation of the first and second bearings 150 and 250. That is, the shaft 50 rotatably supports the drum 30.

In order to stably support the drum 30, the journal of the shaft 50 substantially has a spherical shape. The first and second bearings 150 and 250 surround the end of the journal 52 so as to stably support the journal 52. More particularly, the recesses 178 and 278 of the first and second bearings 150 and 250 substantially have a hemispherical shape. Thereby, the first and second bearings 150 and 250 support the shaft 50 in the axial direction of the shaft 50 as well as in the radial direction of the shaft 50. As a result, the above bearing structure stably supports the drum 30 as well as the shaft 50.

Preferably, the journal 52 of the shaft 50 has a cutting portion 58. A designated space 175, as shown in FIG. 2, is formed between the cutting portion 58 of the journal 52 and the first and second bearings 150, and the grease is stored in the space 175. Thereby, the grease is sufficiently supplied to the first and second bearings 150 and 250 for providing effective lubrication. Preferably, at least one oil groove (not shown) is formed in the outer circumferential surface of the journal 52. The oil groove always stores a designated amount of the grease, and supplies the grease to the space 175 between the journal 52 and the first and second bearings 150 and 250 for providing effective lubrication.

The journal 52 is made of a metal, and is formed on the body 54 by injection molding. Since the journal 52 is made of a metal, the abrasion of the journal 52 is drastically reduced. The first and second bearings 150 and 250 are made of plastic. Preferably, the first and second bearings 150 and 250 are also formed by injection molding. Since the first and second bearings 150 and 250 can be finely manufactured and easily finished differing from a bearing made of a metal, surfaces of the first and second bearings 150 and 250 contacting the journal 52 have high surface roughness. Thereby, the abrasion of the journal 52 is more reduced, and the generation of noise is reduced also.

FIGS. 12 to 17 illustrate a modification of the first embodiment of the bearing structure. In the above modification, first and second bearings are substantially formed as a single body with first and second housings. Hereinafter, the modification of the first embodiment will be described in more detail.

Figure 12:
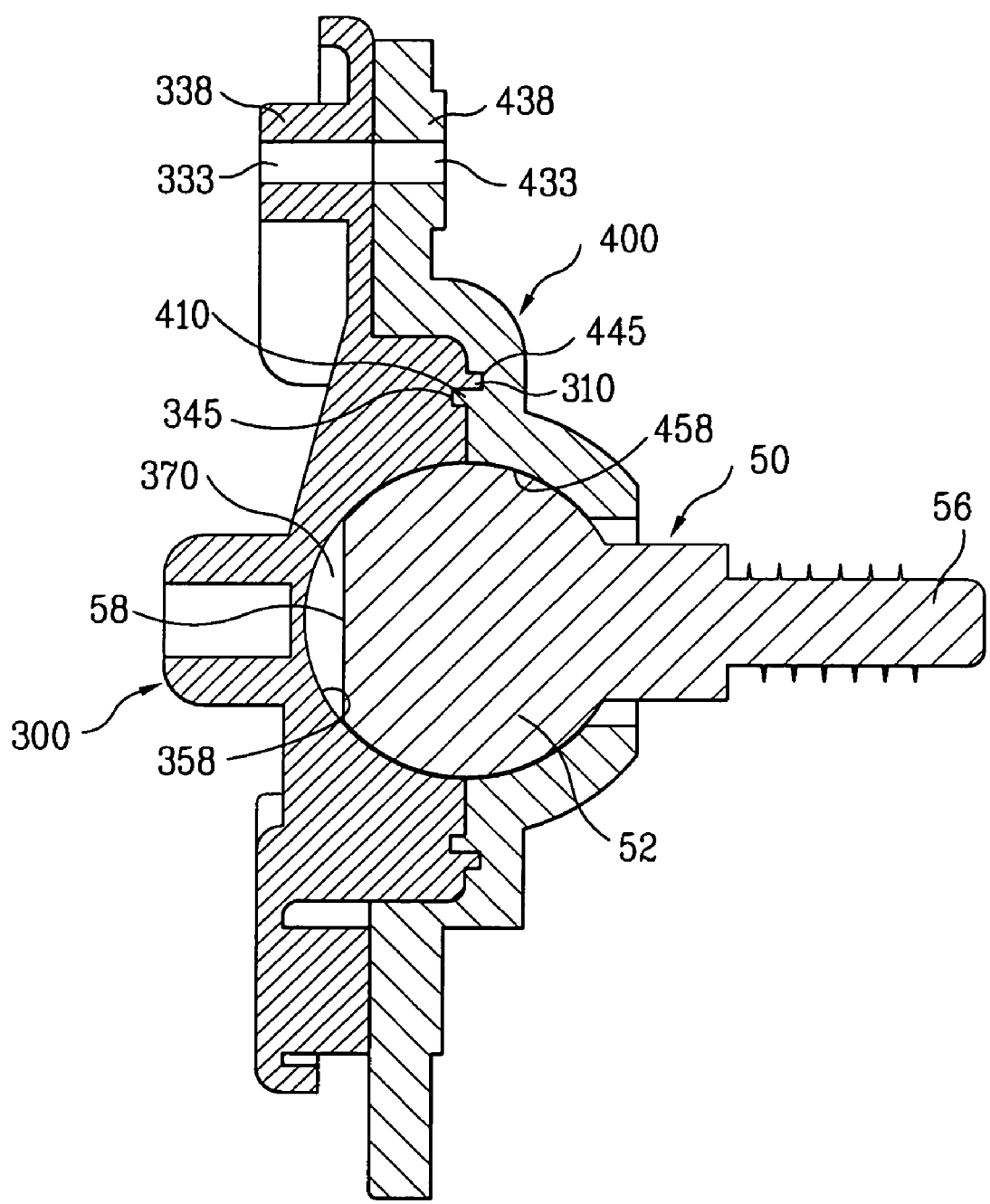
FIG. 12 is a sectional view of a modification of the first embodiment of the bearing structure.
Figure 13:
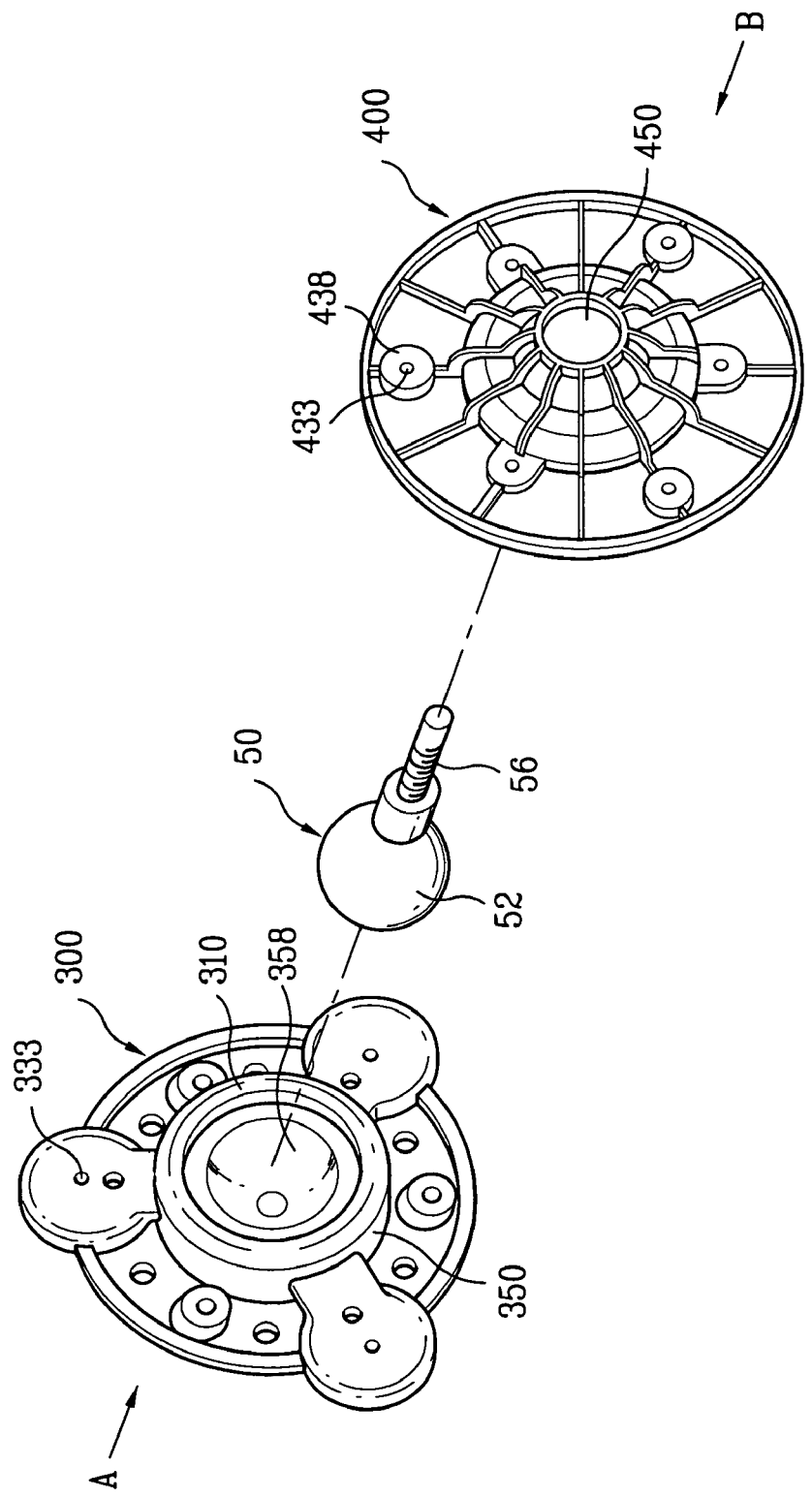
FIG. 13 is an exploded perspective view of the modification of FIG. 12.

FIG. 12 is a sectional view of the modification of the first embodiment of the bearing structure, and FIG. 13 is an exploded perspective view of the modification of FIG. 12. As shown in FIGS. 12 and 13, the modification comprises first and second bearings 300 and 400, and a shaft 50.

The first bearing 300 is connected to the drum 30 (FIG. 1), and the second bearing 400 is connected to the first bearing 300. The shaft 50, and more precisely, the journal 52 of the shaft 50, is disposed between the first bearing 300 and the second bearing 400.

Figure 14:
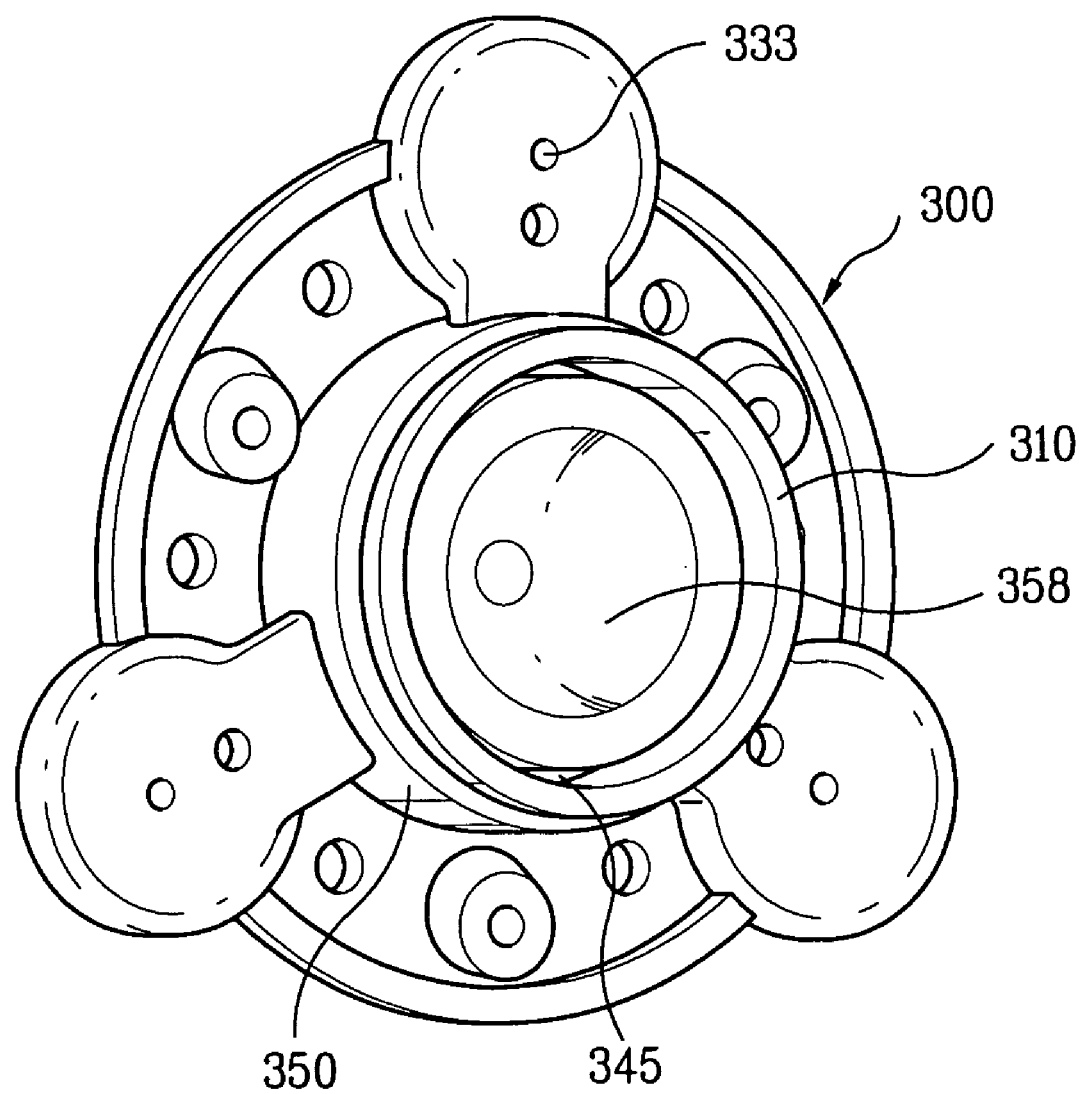
FIG. 14 is a perspective view of a first bearing observed in the direction of "B" of FIG. 13.
Figure 15:
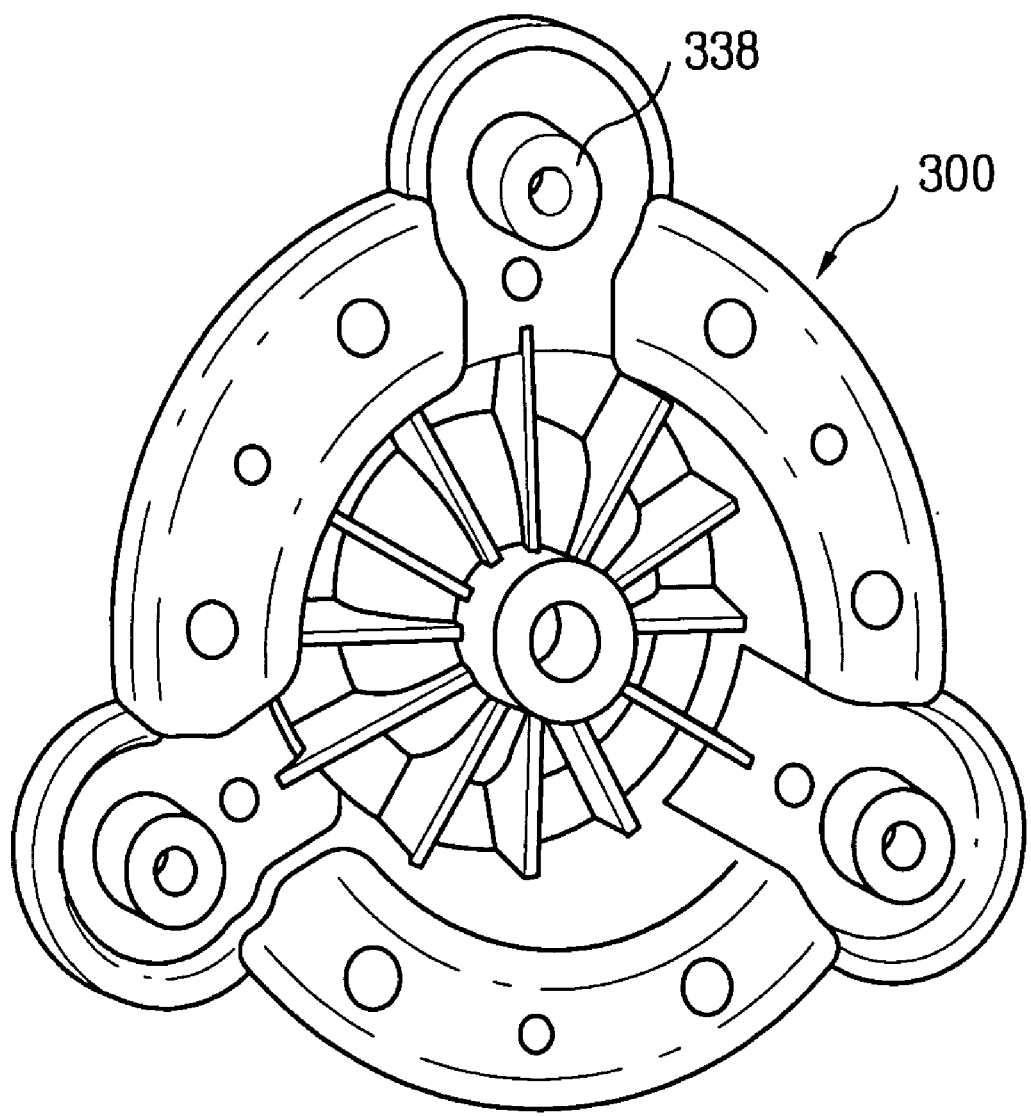
FIG. 15 is a perspective view of the first bearing observed in the direction of "A" of FIG. 13.

With reference to FIGS. 14 and 15, the first bearing 300 comprises a boss 350 protruded from the central portion thereof, and a recess 358 formed in the boss 350 for mounting the journal 52. The first bearing 300 further comprises a plurality of connection holes 333 formed along the edge of the first bearing 300 so that the first bearing 300 is connected to the drum 30 by the connection holes 333. Preferably, as shown in FIG. 15, in order to reinforce the strength of the first bearing 300 and connection portions, the connection holes 333 are respectively formed in corresponding bosses 338. A circular rib 310 and a circular groove 345 are formed on and in the first bearing 300 along the circumference of the recess 358.

Figure 16:
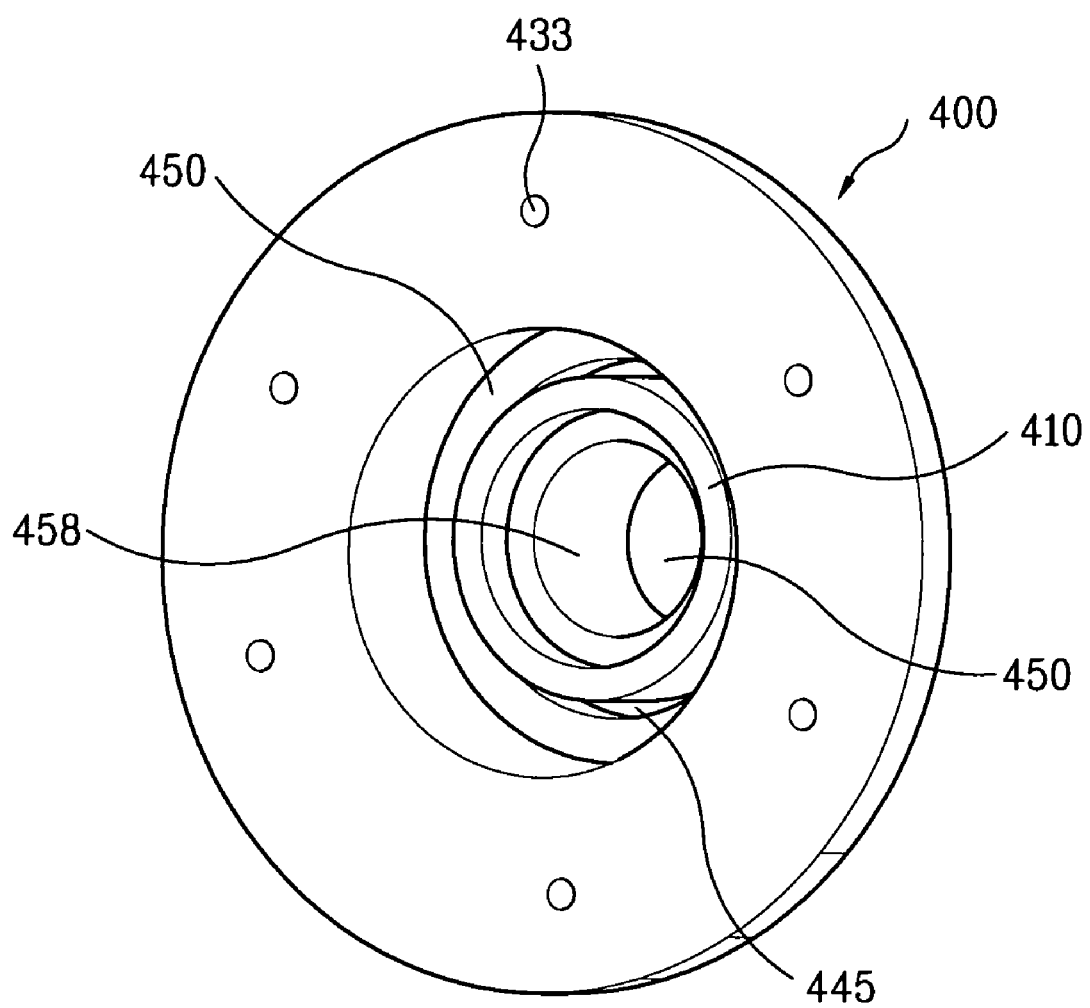
FIG. 16 is a perspective view of a second bearing observed in the direction of "A" of FIG. 13.
Figure 17:
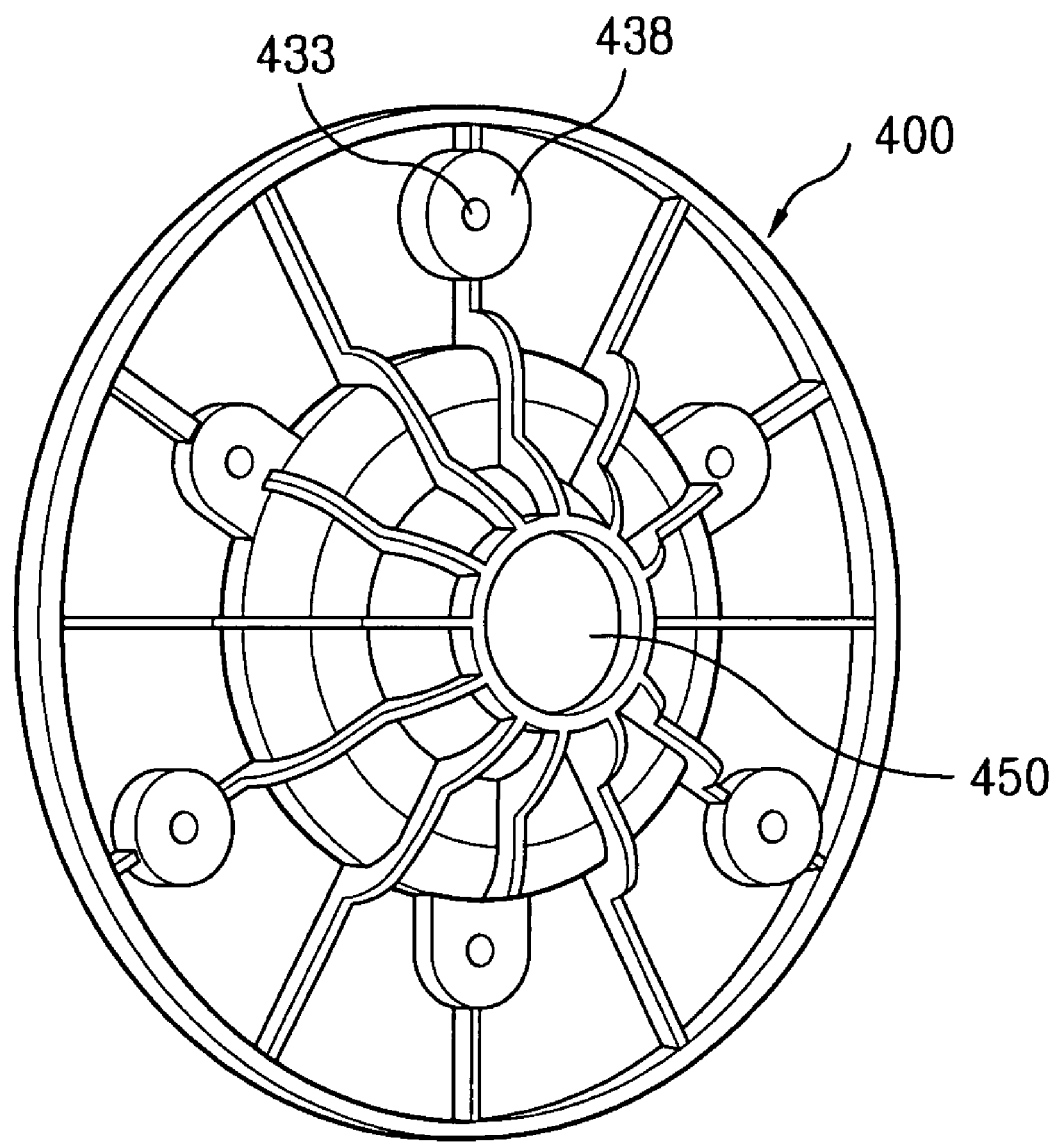
FIG. 17 is a perspective view of the second bearing observed in the direction of "B" of FIG. 13.

With reference to FIGS. 16 and 17, the second bearing 400 comprises a seat 450 for mounting the boss 350 of the first bearing 300, and a recess 458 formed in the seat 450 for mounting the journal 52 of the shaft 50. A through hole 450 for passing the shaft 50 is formed through the recess 458. A plurality of connection holes 433 formed through the second bearing 400 along its edge at positions corresponding to the connection holes 333 of the first bearing 300. Preferably, as shown in FIG. 17, in order to reinforce the strength of the second bearing 400, the connection holes 433 are respectively formed in corresponding bosses 438. A circular rib 410 and a circular groove 445 are formed on and in the second bearing 400 along the circumference of the recess 458 so that the circular rib 410 and the circular groove 445 correspond to the circular groove 345 and the circular rib 310 of the first bearing 300. When the first and second bearings 300 and 400 are connected to each other, the circular rib 310 and the circular groove 345 are engaged with the circular groove 445 and the circular rib 410. Accordingly, the first and second bearings 300 and 400, more precisely, the recesses 358 and 458, are tightly sealed by the circular ribs 310 and 410 and the circular grooves 345 and 445. The circular ribs 310 and 410 and the circular grooves 345 and 445 prevent a grease from leaking from the first and second bearings 300 and 400, and more precisely, from the recesses 358 and 458, during the rotation of the drum.

The shaft 50 comprises a body 54, and the journal 52 supported by the first and second bearings 300 and 400. As shown in FIG. 1, the body 54 is fixed to the rear surface 3 of the cabinet 1 using a screw portion 56 formed on the body 54 and a connection member, and the journal 52 is supported by the first and second bearings 300 and 400. The drum 30 is rotatably connected to the shaft 50. Accordingly, while the drying machine is being driven, the shaft 50 is stationary, and the drum 30 is rotated against the shaft 50 together with the rotation of the first and second bearings 300 and 400. That is, the shaft 50 rotatably supports the drum 30.

In order to stably support the drum 30, the journal of the shaft 50 substantially has a spherical shape. The first and second bearings 300 and 400 surround the end of the journal 52 so as to stably support the journal 52. More particularly, the recesses 358 and 458 of the first and second bearings 300 and 400 substantially have a hemispherical shape. Thereby, the first and second bearings 300 and 400 support the shaft 50 in the axial direction of the shaft 50 as well as in the radial direction of the shaft 50. As a result, the above bearing structure stably supports the drum 30 as well as the shaft 50.

Preferably, the journal 52 of the shaft 50 has a cutting portion 58. A designated space 370, as shown in FIG. 12, is formed between the cutting portion 58 of journal 52 and the first and second bearings 300 and 400, and the grease is stored in the space 370. Thereby, the grease is sufficiently supplied to the first and second bearings 300 and 400 providing effective lubrication. Preferably, at least one oil groove (not shown) is formed in the outer circumferential surface of the journal 52. The oil groove always stores a designated amount of the grease, and supplies the grease to the space 370 between the journal 52 and the first and second bearings 300 and 400 providing effective lubrication.

The journal 52 is made of a metal, and is formed on the body 54 by injection molding. Since the journal 52 is made of a metal, the abrasion of the journal 52 is drastically reduced. The first and second bearings 300 and 400 are made of plastic. Preferably, the first and second bearings 300 and 400 are also formed by injection molding.

Since the first and second bearings 300 and 400 can be finely manufactured and easily finished differing from a bearing made of a metal, surfaces of the first and second bearings 300 and 400 contacting the journal 52 have high surface roughness. Thereby, the abrasion of the journal 52 is more reduced, and the generation of noise is reduced also.

Preferably, the surfaces of the first and second bearings 300 and 400 contacting the journal 52, i.e., the surfaces of the recesses 358 and 458, are coated with a self lubricating material. A material containing Teflon and a material containing carbon are used as the self lubricating material. The above self lubricating material facilitates the effective lubrication of the journal 52, and prevents the abrasion of the journal 52. The first and second bearings 150 and 250 of the first embodiment may employ the self lubricating material.

Figure 18:
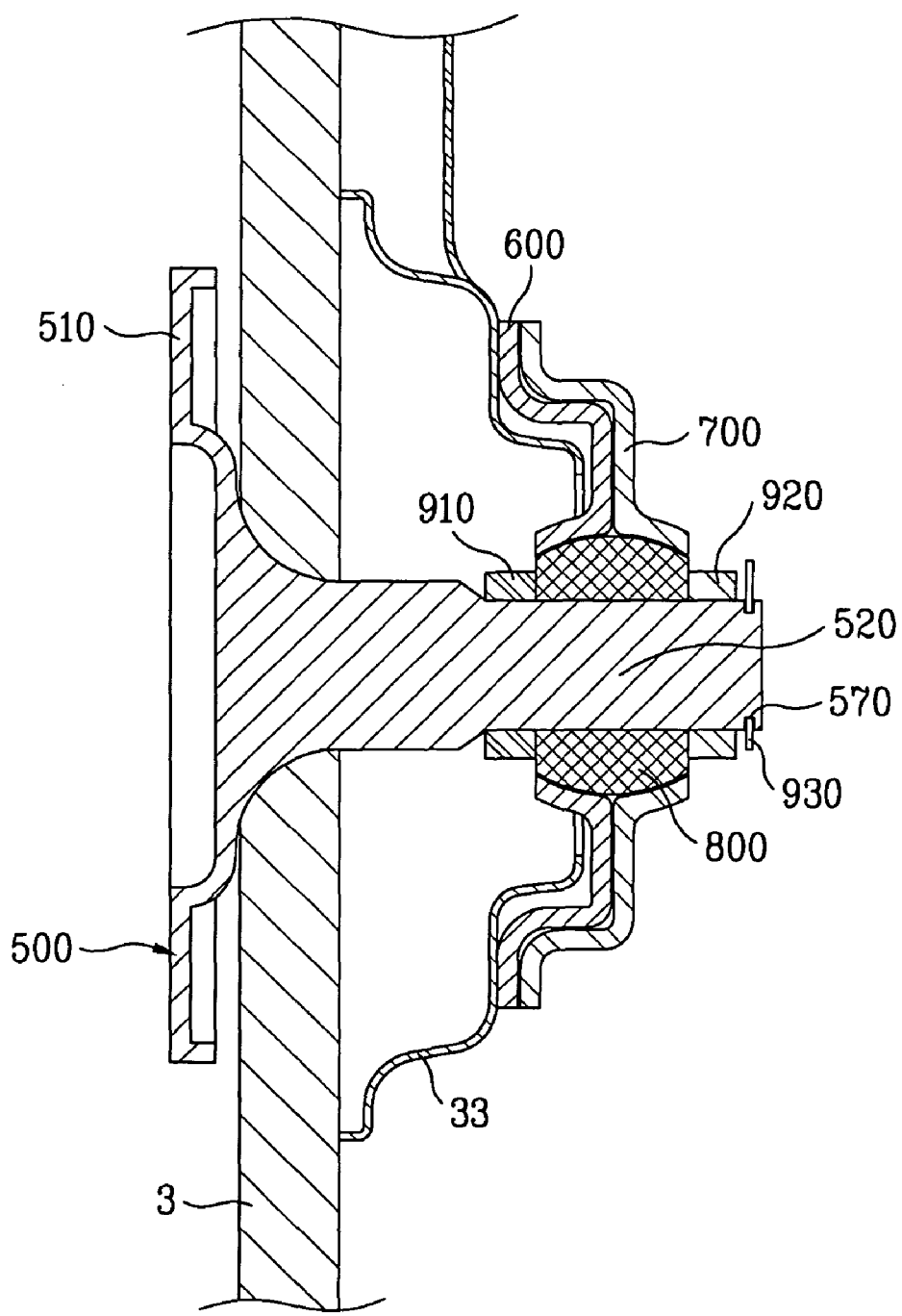
FIG. 18 is a sectional view of a second embodiment of the bearing structure of the drying machine in accordance with the present invention.
Figure 19:
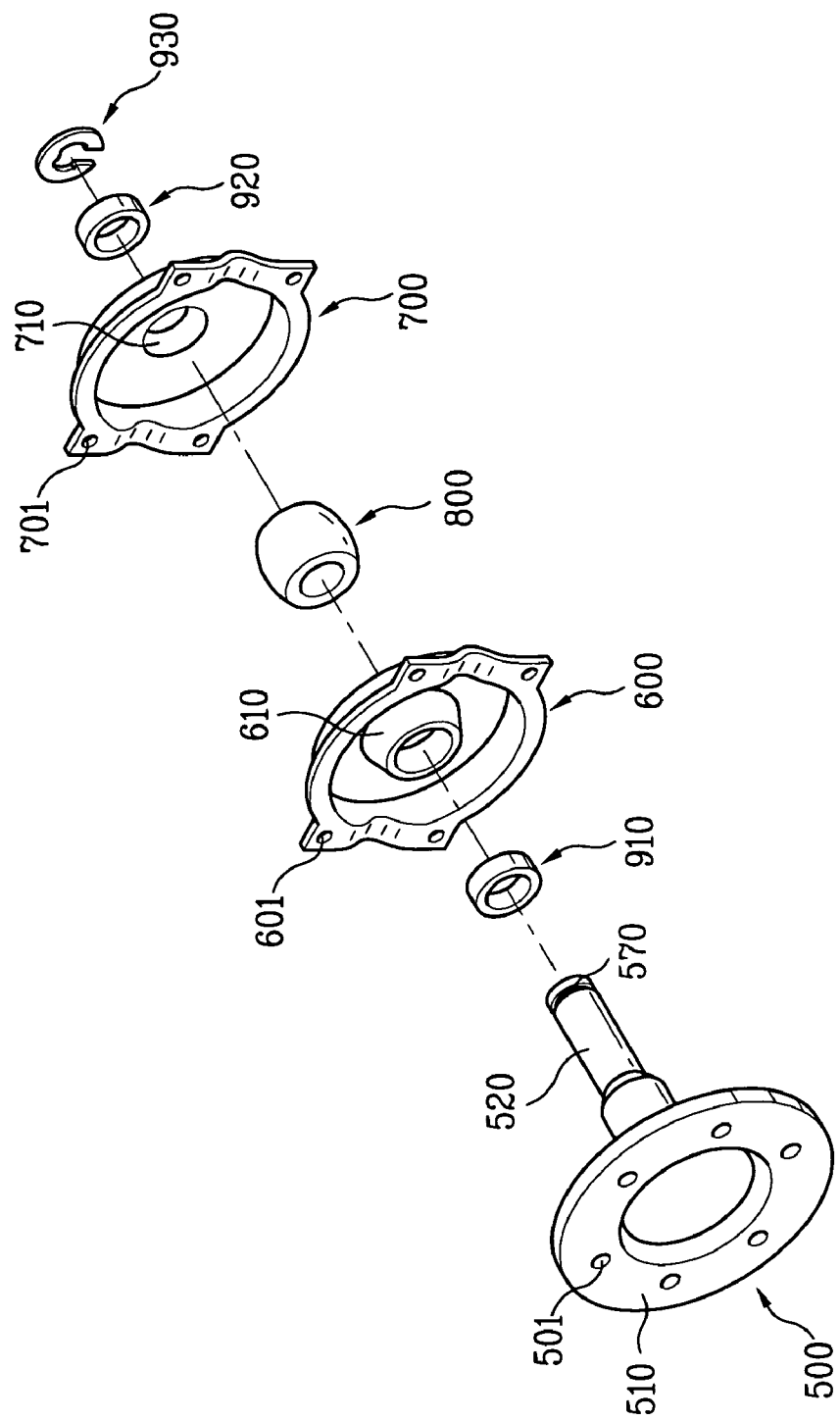
FIG. 19 is an exploded perspective view of the second embodiment of the bearing structure.

FIG. 18 is a sectional view of a second embodiment of the bearing structure of the drying machine in accordance with the present invention, and FIG. 19 is an exploded perspective view of the second embodiment of the bearing structure.

Hereinafter, the second embodiment of the bearing structure will be described in detail with reference to FIGS. 18 and 19, as below.

As shown in FIGS. 18 and 19, the second embodiment of the bearing structure comprises a shaft 500 connected to the drum 30, a housing unit surrounding the shaft 500, and a bearing 800 installed in the first and second housings 600 and 700.

The shaft 500 comprises a flange 510 fixed to the rear surface of the drum 30, and a plurality of connection holes 501 are formed through the flange 510. The shaft 500 further comprises a journal 520 rotatably supported by the bearing 800. The shaft 500 passes through the rear surface 3 of the cabinet 1, and the journal 520 is located at the outside of the cabinet 1. Accordingly, the housing unit and the bearing 800 are disposed at the outside of the cabinet 1 so as to support the journal 520.

The housing unit comprises first and second housings 600 and 700 substantially connected to each other. The first and second housings 600 and 700 respectively comprise seats 610 and 710 for mounting the bearing 800, and connection holes 601 and 701 for connecting the first and second housings 600 and 700 to the rear surface 3 of the cabinet 1.

The bearing 800 is located in the seats 610 and 710 such that the bearing 800 can surround the journal 520, thereby rotatably supporting the shaft 500. The outer surface of the bearing 800 has a designated curvature, and then the seats 610 and 710 have a curvature corresponding to that of the bearing 800, as shown in FIGS. 18 and 19. Accordingly, the bearing 800 is stably installed in the seats 610 and 710 without using separate fixing members. Preferably, an oilless bearing is used as the bearing 800. The oilless bearing is made of a metal having many pores formed therein. Since the pores of the oilless bearing are filled with a lubricating oil, the oilless bearing does not require a separate lubricant.

In order to hold the bearing 800, rings 910 and 920 are installed on the shaft 500 at positions close to the bearing 800. A groove 570 is formed in the end of the shaft 500, and an E-ring 930 is installed in the groove 570. The E-ring 930 prevents the bearing 800 from being separated from the shaft 500, and alternately prevents the shaft 500 from being separated from the bearing 800. As shown in FIG. 18, in order to install the first and second housings 600 and 700 on the cabinet and to improve the structural stability of the bearing structure, a bracket 33 is interposed between the cabinet and the first and second housings 600 and 700. The bracket 33 may be formed integrally with the cabinet.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Effect of the drying machine in accordance with the present invention will be described, as follows.

First, a bearing structure of the drying machine of the present invention is tightly sealed by grooves and ribs engaged with each other. Accordingly, since it is possible to prevent a grease from leaking from the bearing structure, the bearing structure is effectively lubricated, thereby preventing the abrasion of a journal of a shaft and the generation of noise due to the abrasion of the journal.

Second, since bearings are made of plastic, the bearings have fine dimensions and are easily finished. Accordingly, the surfaces of the bearings contacting the journal have high surface roughness, thereby efficiently preventing the abrasion of the journal.

Third, a bearing, which is coated with a self lubricating material, or an oilless bearing is used, thereby providing effective lubrication so as to more efficiently prevent the abrasion of the journal.

What is claimed is:

1. A drying machine comprising:
   a cabinet;
   a drum rotatably installed in the cabinet for containing laundry to be dried;
   a shaft having a body fixed to the cabinet and a journal provided in the body to have a spherical shape;
   a first housing connected to the drum;
   a second housing connected to the first housing and having a through hole for passing the body of the shaft;
   a first bearing provided in the first housing and having a recess for receiving a part of the journal; and
   a second bearing provided in the second housing, wherein the second bearing has a recess for receiving a part of the journal and a through hole for passing the body of the shaft,
   wherein the recess of the first bearing and the recess of the second bearing are connected to each other for sealing the journal of the shaft.

2. The drying machine as set forth in claim 1, wherein one of the first and second bearings comprises ribs formed therein along its edge, and the other one of the first and second bearings comprises grooves engaged with the ribs.

3. The drying machine as set forth in claim 1, wherein the first housing and the first bearing are directly connected to each other without using connection members.

4. The drying machine as set forth in claim 1, wherein one of the first housing and the first bearing comprises at least one protrusion, and the other one of the first housing and the first bearing comprises at least one recess for mounting the at least one protrusion.

5. The drying machine as set forth in claim 1, wherein the first and second bearings are rotated together with the rotation of the drum.

6. The drying machine as set forth in claim 1, wherein the first and second bearings support the shaft in the radial direction and the axial direction of the shaft.

7. The drying machine as set forth in claim 1, wherein a journal of the shaft is made of a metal.

8. The drying machine as set forth in claim 1, wherein a space for storing a grease is formed between the journal of the shaft and the first and second bearings.

9. The drying machine as set forth in claim 1, wherein the journal of the shaft comprises at least one oil groove formed therein along its circumference.

10. The drying machine as set forth in claim 1, wherein the first bearing is formed by injection molding.

11. The drying machine as set forth in claim 1, wherein the first bearing is made of plastic.

12. The drying machine as set forth in claim 1, wherein the second bearing is formed by injection molding.

13. The drying machine as set forth in claim 1, wherein the second bearing is made of plastic.

14. The drying machine as set forth in claim 1, wherein the first and second bearings are respectively formed integrally with the first and second housings.

15. A drying machine comprising:
a cabinet;
a drum rotatably installed in the cabinet for containing laundry to be dried;
a shaft having a body fixed to the cabinet and a journal provided in the body to have a spherical shape;
a first bearing connected to the drum and having a recess for receiving a part of the journal;
a second bearing connected to the first bearing, wherein the second bearing has a recess for receiving a part of the journal and a through hole provided in the recess of the second bearing for passing the body of the shaft,
wherein the recess of the first bearing and the recess of the second bearing are connected to each other for sealing the journal of the shaft.

16. The drying machine as set forth in claim 15, wherein one of the first and second bearings comprises ribs formed therein along its edge, and the other one of the first and second bearings comprises grooves engaged with the ribs.

17. The drying machine as set forth in claim 15, wherein the first and second bearings are rotated together with the rotation of the drum.

18. The drying machine as set forth in claim 15, wherein the first and second bearings support the shaft in the radial direction and the axial direction of the shaft.

19. The drying machine as set forth in claim 15, wherein a journal of the shaft is made of a metal.

20. The drying machine as set forth in claim 15, wherein the recess of the first bearing is formed in a boss provided on the first bearing.

21. The drying machine as set forth in claim 15, wherein a space for storing a grease is formed between a journal of the shaft and the first and second bearings.

22. The drying machine as set forth in claim 15, wherein the journal of the shaft comprises at least one oil groove formed therein along its outer circumferential surface.

23. The drying machine as set forth in claim 15, wherein the first and second bearings are formed by injection molding.

24. The drying machine as set forth in claim 15, wherein the first and second bearings are made of plastic.

25. The drying machine as set forth in claim 15, wherein each of the first and second bearings comprises connection holes formed through bosses provided on the first and second bearings.

26. The drying machine as set forth in claim 15, wherein the internal surfaces of the first and second bearings contacting the journal of the shaft are coated with a self lubricating material.

27. The drying machine as set forth in claim 26, wherein the self lubricating material is a material containing Teflon.

28. The drying machine as set forth in claim 26, wherein the self lubricating material is a material containing carbon.

29. A drying machine comprising:
a cabinet;
a drum rotatably installed in the cabinet for containing laundry to be dried;
a bracket fixed outside surface of the cabinet;
a shaft connected to the drum;
a first housing fixed to the bracket to be disposed outside the cabinet, wherein the first housing has a through hole for passing the shaft and a seat;
a second housing connected to the first housing to be disposed outside the cabinet, wherein the second housing has a through hole for passing the shaft and a seat; and
a bearing installed between the seat of the first housing and the seat of the second housing for rotatably supporting the shaft.

30. The drying machine as set forth in claim 29, wherein the shaft comprises a flange fixed to the rear surface of the drum.

31. The drying machine as set forth in claim 29, further comprising rings installed on the shaft for holding the bearing.

32. The drying machine as set forth in claim 29, further comprising an E-ring installed on the shaft for preventing the bearing from being separated from the shaft.

33. The drying machine as set forth in claim 29, wherein the bearing is an oilless bearing.

* * * * *